United States Patent [19]

Havlovitz

[11] Patent Number: 5,127,762
[45] Date of Patent: Jul. 7, 1992

[54] CONNECTOR ASSEMBLY

[75] Inventor: Paul Havlovitz, Escondido, Calif.

[73] Assignee: Republic Tool & Mfg. Corp., Carlsbad, Calif.

[21] Appl. No.: 318,555

[22] Filed: Mar. 3, 1989

[51] Int. Cl.$^5$ ................................................. F16B 7/14
[52] U.S. Cl. ................................... 403/298; 403/108; 403/300; 403/328
[58] Field of Search ............... 403/298, 297, 295, 292, 403/108, 300, 228, 329, 109, 377, 328

[56] References Cited

U.S. PATENT DOCUMENTS

| | | | |
|---|---|---|---|
| 2,473,388 | 6/1949 | Rambo | 403/292 |
| 2,588,901 | 3/1952 | Weikart . | |
| 2,982,586 | 5/1961 | Gliebe | 403/377 X |
| 3,269,754 | 8/1966 | Bertling et al. . | |
| 3,294,429 | 12/1966 | Halip | 403/295 |
| 3,446,523 | 5/1969 | Little | 403/108 |
| 3,521,913 | 7/1970 | Verhein et al. . | |
| 3,533,513 | 10/1970 | Berman . | |
| 3,811,455 | 5/1974 | Thur | 403/109 X |
| 3,883,257 | 5/1975 | Delafield | 403/298 X |
| 3,980,409 | 9/1976 | Turner | 403/297 |
| 4,068,346 | 1/1978 | Binder | 403/300 X |
| 4,135,835 | 1/1979 | Kitchen et al. | 403/108 |
| 4,323,319 | 4/1982 | Adams | 403/295 X |
| 4,640,572 | 2/1987 | Conlon | 403/297 X |
| 4,802,294 | 2/1989 | Baus | 403/295 X |
| 4,903,924 | 2/1990 | Rutsche et al. | 403/292 X |

FOREIGN PATENT DOCUMENTS 2024508 12/1971 Fed. Rep. of Germany ...... 403/292

Primary Examiner—Peter M. Cuomo
Attorney, Agent, or Firm—Harry Williams

[57] ABSTRACT

The invention provides an easily assembled connector for handle sections of a wheeled appliance in which the connector is formed from a plastic having an agressive memory for enabling a pair of opposed tab members thereon formed from the same material to cooperate with respective apertures in the handle members to be joined or connected. The handle members are slip-fitted the one onto the other with the connector occupying a reinforcing position on the inside surface of the end of the innermost handle member in one embodiment and, according to another embodiment in which the connector housing comprises two half portions, joins the handle members in an abutting relationship. In this latter embodiment both halves of the connector are additionally provided with rib portions which facilitate sliding movement of the connector within the interior surface of the respective handle members; also, one half of the connector has slightly higher rib portions than the other half, so that the higher-ribbed half then becomes that part of the connector which requires a press fit into one of the handle members, this last fit intended to be performed at the factory.

3 Claims, 2 Drawing Sheets

CONNECTOR ASSEMBLY

BACKGROUND OF THE INVENTION

The present invention is related to connectors or couplings for securing together unthreaded pipe or tubular members. The invention has particular application to handle members for manually operated gardening and harvesting appliances which are normally propelled by hand and are supported by a pair of wheels, such as lawn mowers, drop spreaders, broadcast spreaders and the like.

In many cases the handles for such appliances are of the knockdown type by which means the appliance can be compactly shipped from the manufacturer to the point of sale; and also, once in use by the consumer, it can be stored away in a compact space after the handle has been disassembled by the consumer. Naturally, such handles comprise more than one piece and their ease of assembly and overall strength and durability are brought into question because of the joint portions necessary for assembly and disassembly, the joints themselves often being the weakest portion of the handle. There is a need, then, for providing an articulated handle which does not suffer from defects of this kind. Specifically, there is a need to provide an articulated handle which is easy to assemble, which does not require tools, and when assembled is as strong and durable as one which is constructed from a single tube or bar member.

OBJECTS AND SUMMARY OF THE INVENTION

It is the primary purpose and principle object of the present invention to address the aforementioned needs and provide, therefore, an articulated handle for a wheeled appliance of the aforementioned type which is characterized by its ease of assembly without the use of tools and which has particular appeal to the non-mechanically minded user of the appliance. In furthering the aforementioned objective, the invention provides joint connections for an articulated handle so that the handle can be easily and quickly assembled or disassembled without tools and without sacrificing overall strength and durability. In particular, the present invention provides a connector assembly which joins two tubular handle members together so that the tubular material of the members at the joint portion is reinforced by an underlying metal sheath in one embodiment. In another embodiment, the ends of the handle members overlap one another and are connected by the connector housing of the invention so that all three members overlap in a concentric relationship to thereby provide a secure joint.

Further, there is provided a joint connector which is adapted to have one part press-fitted with one handle member and another opposed part adapted to be slip-fitted to the other handle member. In this way the connector is retained by one of the handle members at all times and is prevented, therefore, from becoming an isolated or separate element subject to misplacement or loss. The press-fit portion of the connector assembly according to the invention is, however, capable of being removed from its mooring in the handle member by using more than average or normal force, such as would be required to provide a removable or slip-fit, so that if it is desired to remove the connector from both handle members, that is possible as well. Normally, however, the invention contemplates establishing the press-fit of the connector to one handle member at the factory, so that the user or operator of the appliance will only have to manipulate the removable portion of the connector in order to implement handle assembly or disassembly. By having one of the portions of the connector already assembled at the factory, that is, press-fitted into one of the handle members, it will be become apparent, then, that only a minimum of assembly steps will be required for the consumer to assemble the handle or subsequently dissassemble the handle.

According to one embodiment of the present invention, there is provided a tubular connector of a generally rectangular cross-section comprising a housing of resilient plastic material having an agressive memory for enabling a pair of opposed tab members thereon to cooperate with respective apertures in the handle members to be joined or connected. The tubular connector is reinforced on its inside surface with a hollow metal member that is of the same material as the handle members to be joined. The connector itself comprises two half portions divided by a thin wall flange portion which abuts the end surfaces of the handle members when assembled on the connector. Both halves of the connector are provided with rib portions which faciliate sliding movement of the connector within the interior surface of the respective handle members. One half has slightly higher rib portions than the other half, so that the higher-ribbed half then becomes that part of the connector which requires a press fit into one of the handle members, that is, a force fit requiring more than normal force to fit the connector into the hollow handle member and, of course, more than normal force to remove the connector from the handle member. Since it is intended that this particular type of fit takes place at the factory, it is also intended that this part of the connector not be removed from its respective handle member, and it remains for the consumer to have only to join the other half of the connector with the remaining handle member for assembling the handle in a minimum number of steps, namely, two steps for a three-piece handle and only one step for a two-piece handle.

In a further embodiment a connector of a generally circular cross-section is provided in which the connector forms a reinforcing support for the telescoping arrangement of respective ends of a pair of handle members. The connector in this particular embodiment is also provided with a pair of opposed locking tab members that engage with respective apertures in the handle members. In this case, however, the apertures in the handle members are superimposed, and the connector serves to lock the handle members together by means of the tab members releasably engaging the superimposed apertures in the handle members.

The invention will be better understood and further objects and advantages thereof will become more apparent from the ensuing detailed description of the preferred embodiments taking in conjunction with the drawings.

DETAILED DESCRIPTION OF THE PREFERRED EMBODIMENTS

Figure 1:
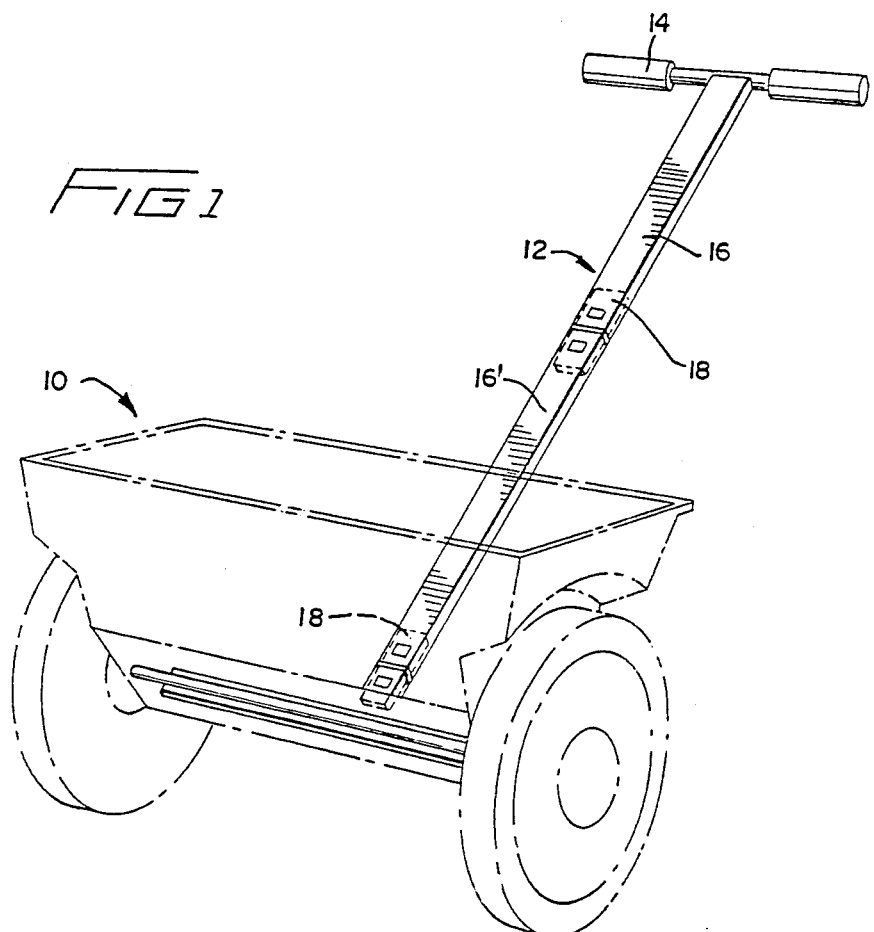
FIG. 1 is schematic perspective of a hand operated device showing the handle thereof assembled according to the principles of the invention.

Referring now to FIG. 1, there is shown a wheeled device 10, such as a lawnmower, drop spreader or some such other harvesting implement or the like, which is manually operated by means of an elongated handle 12 having a suitable gripping means 14. The handle is seen to comprise two separate members 16, 16' which together form the articulated handle 12 when joined by the connector members 18, as shown. While the description below applies to the connector 18 that joins the handle sections 16 and 16', it will be understood that the same operation applies to that connector 18 that joins the lowere end of the central handle section 16' and the lowermost section which is fixed to the wheeled appliance, as shown in FIG. 1.

Figure 2:
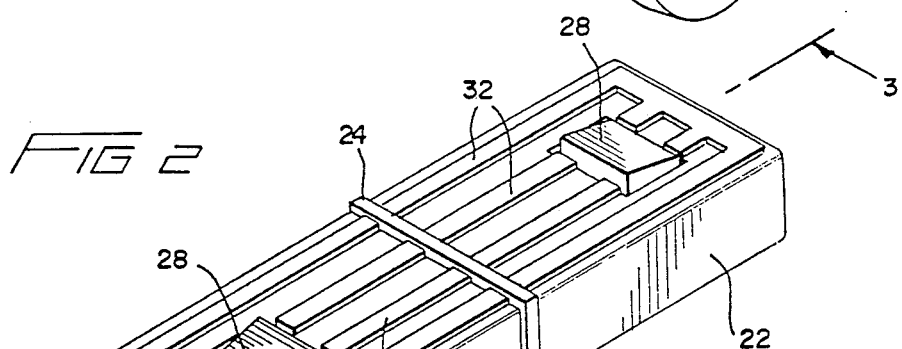
FIG. 2 is schematic perspective view of the connector assembly removed from both handle members.

The connector assembly housing 18 is shown in detail in FIG. 2, wherein it will be seen that the assembly comprises two halves 20 and 22 divided by a flange member 24, against which abut the respective ends of the handle members 16, 16' when positioned in place on the connector assembly housing. The entire assembly is shown to surround a one-piece tubular metal reinforcing member 26, which is made of the same material as the handle members 16, 16'.

In each half of the connector housing 18 a releasable tab 28 is formed or molded from the connector as a cantilevered member which, owing to the type of plastic used, preferrably a plastic such as ACETAL having an agressive memory, allows the tabs to be pressed downwardly and to be released upwardly to function as a locking means, to be more fully discussed below. Also shown are rib portions 30 and 32 extending longitudinally of the respective half sections 20 and 22. These ribs provide an overall reduced surface area of engagement between the housing 18 and the respective interior surfaces of the handle members 16, 16' and thereby function to facilitate sliding engagement between the handle sections and the connector.

Figure 3:
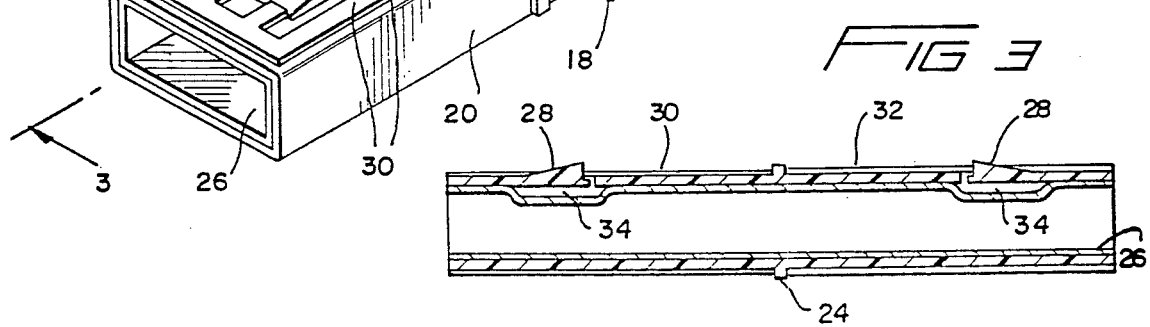
FIG. 3 is schematic cross-sectional view of the connector assembly shown in FIG. 2.

As shown in FIG. 3, the tabs 28 are designed to be pressed downwardly into the spaces provided by depressions or pockets 34 in the tubular reinforcing member 26. Also, it will be seen that the rib portions 30 are less high than the rib portions 32. As a result of this discrepancy the half section 22 is slightly larger in overall thickness than section 20, and it is necessary, therefore, to press-fit the central handle member 16' onto the section 22, this being done at the factory and for the purpose of providing a virtually one-time fit in which that part of the connector is not intended to be removed from its respective handle member. The other half 20 of the connector, owing to its slightly smaller thickness of the ribs 30, is intended to provide a slip-fit for easy assembly which can be released by exerting a nominal amount of force on the other handle member 16, once the tab member 28 is depressed out of its lock-engaging function with the aperture 35 in the handle section 16.

Figure 4:
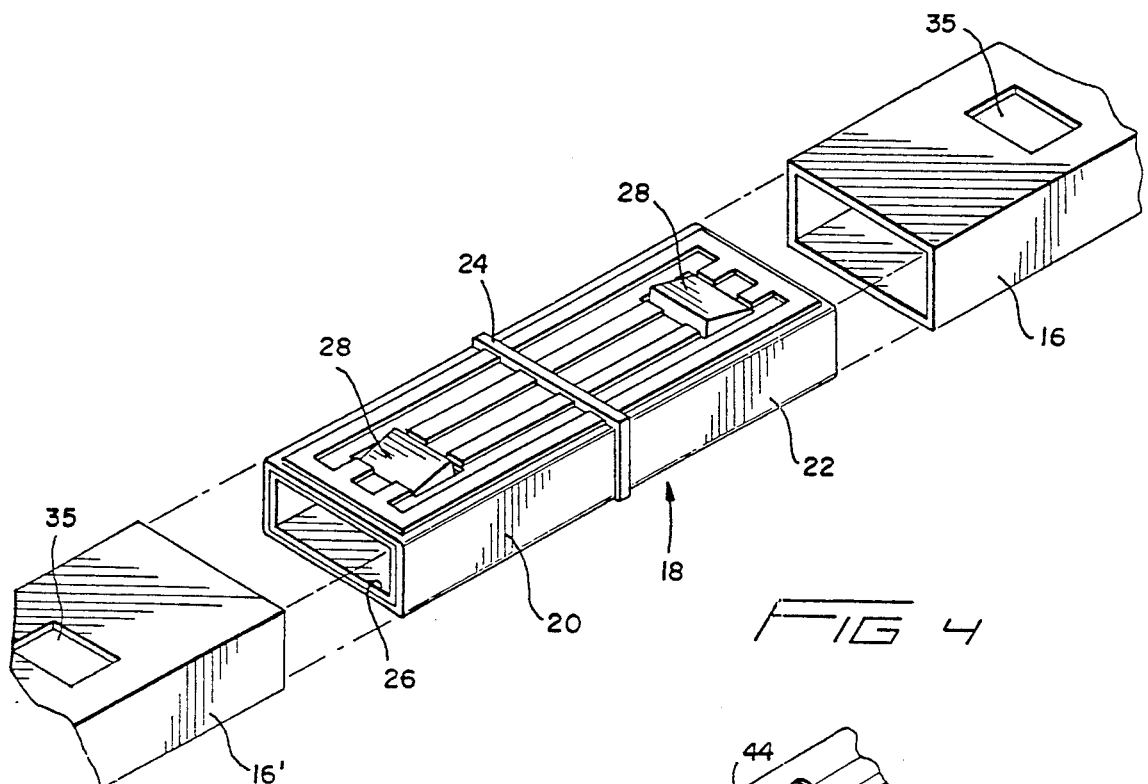
FIG. 4 is a detailed schematic exploded view of the removable connector assembly and handle members shown in FIG. 1.

As shown in FIG. 4, the tabs 28 are designed to cooperate with the apertures 35 in the respective handle members 16, 16' and thereby provide a locking function for the assembled connector. When the tabs 28 are in place in their respective apertures 35 in the handle members 16, 16' the ends of these members will abut against the flange portion 24, thus forming a smooth uninterrupted outline. Also, the reinforcing member 26 is seen to extend the entire length of the connector to thereby provide extra strength to the joint by effectively increasing the thickness of the end portions of the handle sections 16, 16'.

Figure 5:
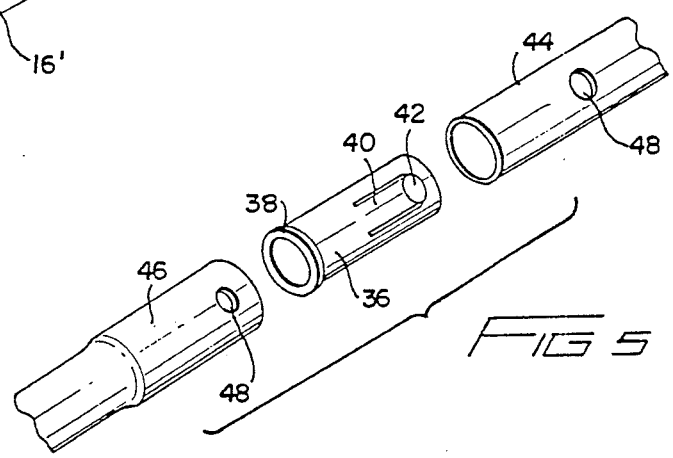
FIG. 5 is a schematic exploded perspective of a further embodiment of the invention.
Figure 6:
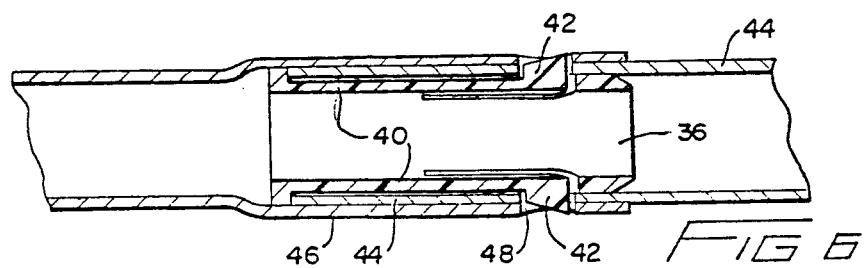
FIG. 6 is schematic cross-section of the assembled connector shown in FIG. 6.

A further embodiment of the invention is shown in FIG. 5 in which a tubular connector 36 is shown and is of generally circular cross-section. The connector 36 is formed of the same plastic material as connector 18, but unlike connector 18 the connector 36 has a flange 38 formed at one end thereof rather than at the central portion. Also provided on the connector 36 is a different arrangement of locking tab members; thus, a pair of opposed locking tab members 40 are provided, and each of these tab members has formed at the free ends thereof a button member 42, as best shown in FIG. 6. It will be seen from FIG. 6 that the handle members 44 and the connector 36 can each be slip-fitted into the other to form a reinforced connection. More particularly, the connector 36 is slip-fitted into one end of one of the handle members so that the end thereof abuts against the flange 38, as shown. The button portions 42 of the tab members 40 are then aligned with the apertures 48 in the end of the handle member 44, so that by virtue of the biasing action of the tab members 40 the button portions 42 snap into place. One end of the other handle member 46 is shown to be of an enlarged cross-section so that it can be slip-fitted over that end of the other handle member which contains the connector 36, the flange 38 of the connector 36 forming a smooth contiguous surface with the outside surface of handle member 44 to thus enable a slip-fit between the two handle members 44 and 46. When this latter step is implemented, the releasable button portions 42 of the tab members 40 are aligned with the apertures 48 in the enlarged end-section of the other handle member 46 so that locking engagement between the two handle members can take place. Two important fuctions are accomplished by the tabs 42, one, the respective handle members 44 are locked into place, each with respect to the other, and, two, the one member is prevented from rotating with repect to the other.

The method of assembly of the garden implement according to the invention described with respect to FIGS. 1–4 is as follows. Assuming that the handle 12 of the garden implement 10 is composed of three sections, then a connector 18 will be provided at each end of the central handle section 16', this provision having been made at the factory as a force-fit or press-fit operation. Because of this first step having been conducted at the factory, the user need only slip fit the respective free ends of the connectors 18 at each end of the section 16' into the respective ends of the remaining handle sections provided, that is, the upper section 16, as above described, and, similarly, a lower section fixed to the base of the appliance, as shown in FIG. 1, to thereby assemble a three-piece articulated handle. In the case of a two-piece handle, however, only one connector need be provided on one end of one of the sections in the manner above-described.

In the embodiment shown in FIGS. 5 and 6, the connector 36 is inserted into one end of the handle member 44 so that the end thereof abuts against the flange 38. The connector 36 is then rotated until the locking tabs 42 are aligned with the apertures 48 so that the tabs 42 are locked into place. The assembled connector and handle member are then inserted as a unit into the enlarged section of the other handle member 46. The apertures 48 on the handle member 46 are aligned with the locking tabs 42 so that the latter lock into place in the respectively aligned apertures. When so locked the handle members are prevented from being pulled apart and are also prevented from being rotated with respect to one another, thus forming together a single reinforced joint by means of the connector.

The foregoing relates to preferred exemplary embodiments of the present invention, it being understood that other embodiments thereof are possible within the scope of the invention, the latter being defined by the appended claims.

What is claimed and desired to be secured by Letters Patent of the United States is:

1. A connector assembly for joining together two separable tubular handle members of an articulated handle for a wheeled implement bearing a load, comprising
   a tubular housing formed of a single piece of resilient plastic material,
   a non-elastic reinforcing tubular member disposed on the inside surface of said housing for strengthening said plastic tubular housing,
   said housing having an exterior flange member extending generally at right angles to the longitudinal axis of said housing,
   engaging means in respective ones of said handle members, and
   cantilevered locking means formed in said housing on either side of said flange, said locking means being formed from said resilient plastic material for cooperating with said engaging means in said respective handle members.

2. A connector assembly for joining together two separable tubular handle members of an articulated handle for a wheeled implement bearing a load, comprising
   a tubular housing formed of a single piece of resilient plastic material,
   engaging means in respective ones of said handle members,
   one of said handle members having an enlarged cross-section end portion with respect to the end portion of the other of said handle members, and
   cantilevered locking means formed in said tubular housing from said resilient plastic material for engagingly and disengagingly cooperating with said engaging means in said respective handle members only when said handle members and said tubular housing are disposed in a concentric and superimposed relationship with respect to one another and said locking means in said tubular housing and said engaging means in said respective handle members are aligned.

3. A connector assembly for joining together two separable tubular handle members of an articulated handle for a wheeled implement bearing a load, comprising
   a tubular housing formed of a single piece of resilient plastic material,
   engaging means in respective ones of said handle members,
   cantilevered locking means formed in said housing from said resilient plastic material for cooperating with said engaging means in said respective handle members,
   said housing having an exterior flange member at one end thereof and extending generally at right angles to the longitudinal axis of said housing, said housing adapted to be slip-fitted into one end of one of said handle members so that said one end abuts against said flange member, and
   the other of said handle members having an enlarged cross-section at one end thereof for receiving said one end of said one handle member, whereby said locking means engages and disengages said engaging means in said respective handle members when aligned.

* * * * *